United States Patent [19]
Diepstraten et al.

[11] Patent Number: 5,410,738
[45] Date of Patent: Apr. 25, 1995

[54] SYSTEM AND METHOD FOR LINKING WIRELESS LOCAL AREA NETWORKS

[75] Inventors: Wilhemus J. M. Diepstraten, Diessen; Rienk Mud, Duurstede, both of Netherlands

[73] Assignee: NCR Corporation, Dayton, Ohio

[21] Appl. No.: 753,778

[22] Filed: Sep. 3, 1991

[51] Int. Cl.$^6$ ............................................. H04B 7/00
[52] U.S. Cl. .................................... 455/58.2; 455/66; 455/78; 370/85.13
[58] Field of Search ................... 455/66, 78, 79, 50.1, 455/51.1, 58.2; 370/85.13

[56] References Cited

U.S. PATENT DOCUMENTS

| | | | |
|---|---|---|---|
| 2,731,622 | 1/1956 | Doremus et al. | 455/58.2 |
| 4,715,030 | 12/1987 | Koch et al. | 370/85.13 |
| 5,046,066 | 9/1991 | Messenger | 455/66 |

OTHER PUBLICATIONS

Arlan 100 Test Configurations; Telesystems, SLW Inc. Dec. 1988.
Opnet M Version Product Description; MIL 3, Inc.
Arlan 400 Wireless LAN; Telesystems SLW Inc.
Wireless Personal Links, Office LAN Under Test, The Institute, IEEE Spectrum, May/Jun. '91, pp. 1, 5.
"NCR Offers New Wireless Computer"; Peter Lewis; Dayton Daily News, Sep. 30, 1990.
Communications: Supervising Scarcity; National Journal; Jul. 7, 1990.
Motorola Tivst With Microwave LAN Link; Joanie Wexler, Computer World; Oct. 29, 1990.
Cutting the Computer Wire Snaul; Keith Buadshevj The New York Times, Nov. 21, 1990.
Motorola To Unveil Technology Today for Wireless Computer Systems; John Keller; Oct. 23, 1990.

*Primary Examiner*—Reinhard J. Eisenzopf
*Assistant Examiner*—Philip J. Sobutka
*Attorney, Agent, or Firm*—Paul J. Maginot; Douglas S. Foote

[57] ABSTRACT

A wireless local area network (LAN) station and method for operating the same. The station has a number of antennas for communicating with a similar number of LANs, respectively. Transmissions from one antenna are blocked when the other antenna is receiving RF signals.

5 Claims, 6 Drawing Sheets

SYSTEM AND METHOD FOR LINKING WIRELESS LOCAL AREA NETWORKS

The present invention relates to wireless local area networks. More particularly, it relates to linking two or more such networks and avoiding interference therebetween when data is transmitted.

CROSS-REFERENCE TO RELATED APPLICATION

"Local Area Network Having A Wireless Transmission Line", U.S. application Ser. No. 633,691, invented by A. Kamerman and H. van Bokhorst.

BACKGROUND OF THE INVENTION

Various methods are known for sharing network communication channels or links among stations in a local area network. One widely used method is known as CSMA/CD, (carrier sense multiple access with collision detection). According to this method, a station wishing to transmit a message listens until the transmission channel is idle before commencing to transmit an information packet. Furthermore, the station continues to listen to the channel after commencing a transmission. If a collision is detected, indicating another station has also commenced transmission of an information packet, the station detecting the collision terminates its message transmission and transmits a jam pattern (or garble). In this manner, all other stations are informed of the collision. Once informed, the stations terminate message transmission and wait a random time before attempting to commence a further message transmission.

The CSMA/CD protocol is the subject of an international (ISO) standard and corresponding IEEE Standard, No. 802.3, and has become a generally used protocol for LANs utilizing wired connections for transmission between the stations. In consequence, CSMA/CD LAN controller chips have become widely commercially available. Several manufacturers produce such chips, complying with the IEEE 802.3 standard. An example is the Intel 82586 LAN coprocessor chip, available from Intel Corporation of Santa Clara, Calif., U.S.A. Such chips provide various functions useful in LANs, such as data rate range and backoff algorithm and configurable parameters such as slot time duration, retry counter offset and limit, and interframe spacing time.

A disadvantage of wired LANs is that extensive cabling is required to interconnect the stations. Cabling is generally inconvenient to install and gives rise to inflexibility if it is later desired to alter the physical locations of the stations. It has been proposed to utilize a wireless transmission link operating at radio frequencies to replace the cabling interconnections of a LAN. However, if only a single radio channel is to be utilized for such a LAN, the widely accepted CSMA/CD protocol cannot generally be applied since a station cannot normally receive (or listen) while it is transmitting.

A single radio channel or frequency band is commonly used by multiple LANs. Normally, there is no interference between such LANs if they are sufficiently separated by distance or by a physical barrier such as a wall, floor or building. To increase the coverage area of a LAN, two or more LANs can be linked by a single LAN station which serves as a bridge. The bridging station is provided with a number of antennas, each antenna communicating respectively to a designated LAN. A bridging station can apply an algorithm that learns which signal data transmitted in one LAN is destined to a station on the other LAN. Signal data received by the antenna associated with a first LAN, can be retransmitted via the antenna associated with a second LAN.

As noted, the bridging station has one antenna designated to receive signals from each LAN. Frequently, another (non-designated) antenna of the bridging station will pick up signals intended to be received by the designated antenna. Upon detecting such a signal, the non-designated antenna will temporarily refrain from transmitting to avoid interfering with reception of the designated antenna. However, if the designated antenna receives a weak signal from its LAN, then the non-designated antenna might not detect that signal at all. If the non-designated antenna does not detect the signal, it may assume that it is free to commence a transmission. However, if one antenna starts to transmit when the other is receiving data, the transmitted signal can easily interfere with reception on the other antenna. Such interference is the problem the present invention addresses.

OBJECTS OF THE INVENTION

It is therefore an object of the present invention to reduce interference between a plurality of antennas connected to a local area network station.

It is another object of the present invention to provide a new and improved method of linking two or more wireless local area networks.

It is a further object of the present invention to provide a new and improved method for operating a wireless local area network station having a plurality of transceivers.

It is yet another object of the present invention to provide a new and improved local area network station.

SUMMARY OF THE INVENTION

One form of the present invention is a method for operating a wireless local area network (LAN) bridge station. The bridge station has a number of antennas for communicating with a similar number of LANs, respectively. Transmissions from one antenna are blocked when the other antenna is receiving RF signals. In a preferred embodiment, an electrical signal is generated by the antenna receiving RF signals. This electrical signal is used to control transmissions from the other antenna.

Another form of the present invention is a local area network bridge (LAN) station. The bridge station includes first and second transceivers for communicating with first and second LANs, respectively. The station further includes means for blocking transmissions from one transceiver when the other transceiver is receiving RF signals.

DESCRIPTION OF A PREFERRED EMBODIMENT

Figure 1:
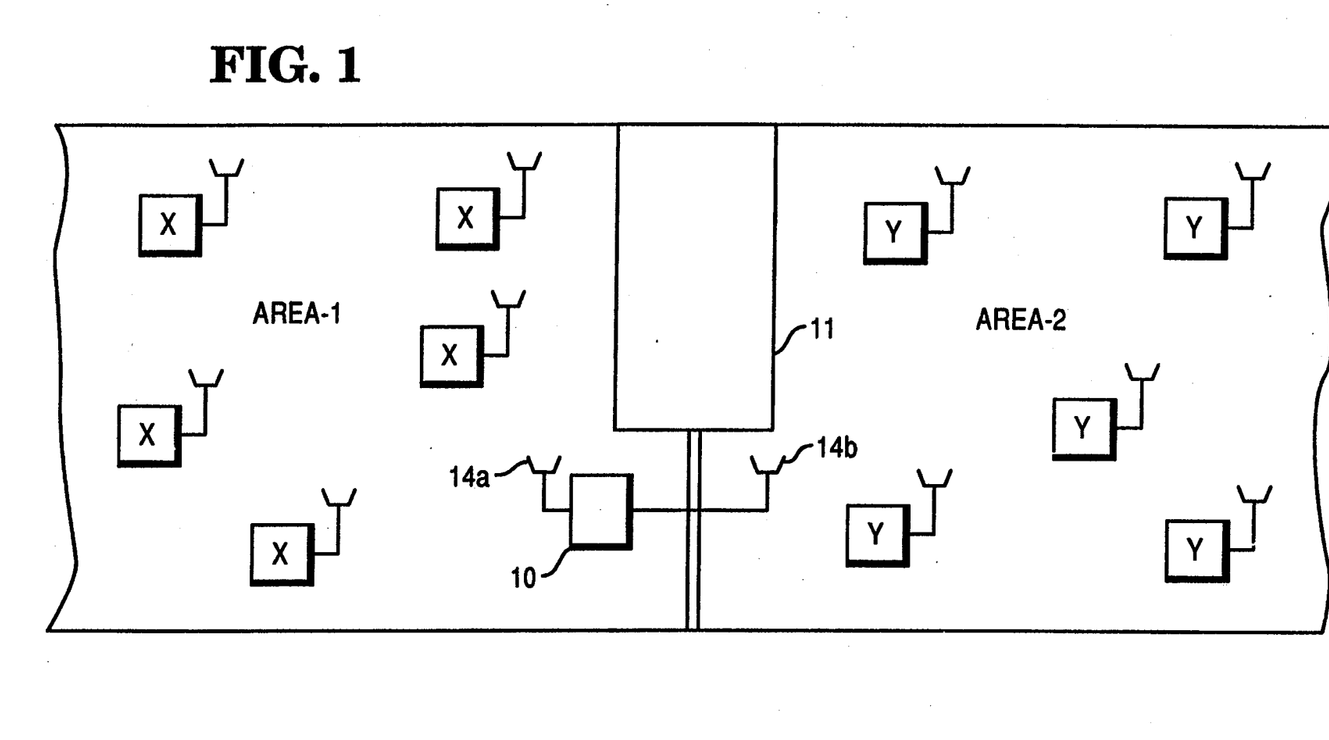
FIG. 1 shows an installation of a bridging LAN station.

FIG. 1 shows a LAN station 10 used as a bridge between two LANs which are deployed in AREA-1 and AREA-2, respectively. The stations in AREA-1 are designated by an "x" and those in AREA-2 by a "y". AREA-1 and AREA-2 are separated by a wall 11 which forms a barrier against the transfer of RF signals between the two areas. Each station x and y includes a network interface card (NIC) (not shown) as an interface between the station and its antenna.

Station 10 is provided with two NICs (not shown) which connect it to antennas 14a and 14b, respectively. Antenna 14a is positioned within AREA-1 and antenna 14b is positioned within AREA-2. Station 10 is located in AREA-1. However, station 10 may be located wherever convenient as long as antennas 14a and 14b are deployed respectively in AREA-1 and AREA-2.

The stations in AREA-1 are linked by RF signals as are those in AREA-2. Wall 11 presents a high attenuation path for these RF signals, such that the stations in AREA-1 and AREA-2 cannot operate all together as a single LAN. Because of the high attenuation, there is not much interference between x and y stations. Furthermore, transmissions within each LAN are prefaced by a network identification code which is generally different for the two LANs. For communication between the LANs, station 10 serves as a bridge. For example, station 10 receives signals from stations x through antenna 14a, stores the signal data in its memory, and retransmits the signal data to stations y over antenna 14b.

Figure 2:
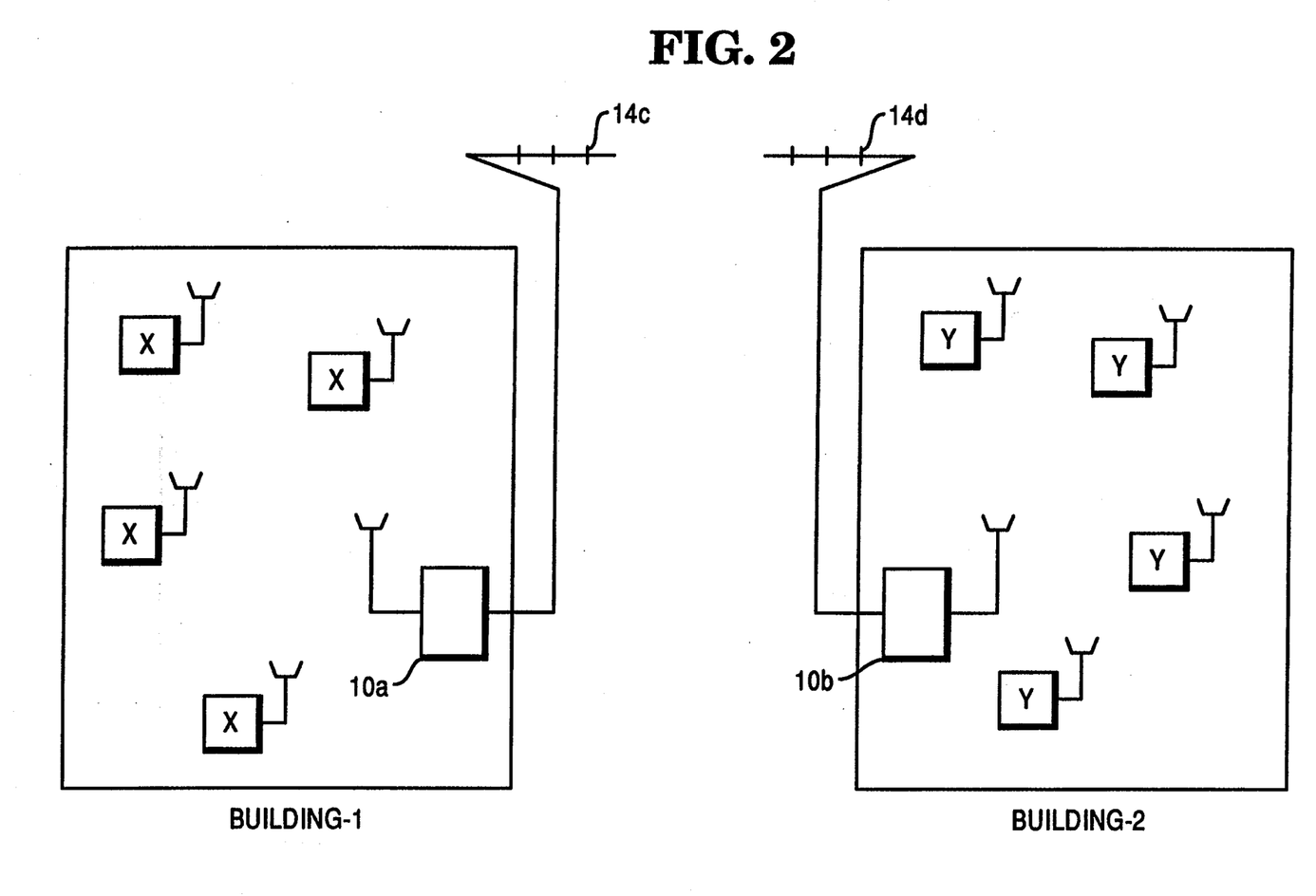
FIG. 2 shows an alternative installation of a bridging LAN station.

FIG. 2 shows an alternative installation for LAN stations used as a bridge between LANs. In this embodiment, LAN station 10a forms a bridge between a LAN deployed in BUILDING-1 and a directional antenna 14c. In a similar arrangement, LAN station 10b forms a bridge between a LAN deployed in BUILDING-2 and a directional antenna 14d. Directional antennas 14c and 14d are typically located at a relatively large distance from their respective stations 10a and 10b by way of extension cables. For example, antennas 14c and 14d can be located on a roof or outside a building wall. Directional antennas 14c and 14d are pointed at each other and have a range of several miles.

Figure 3:
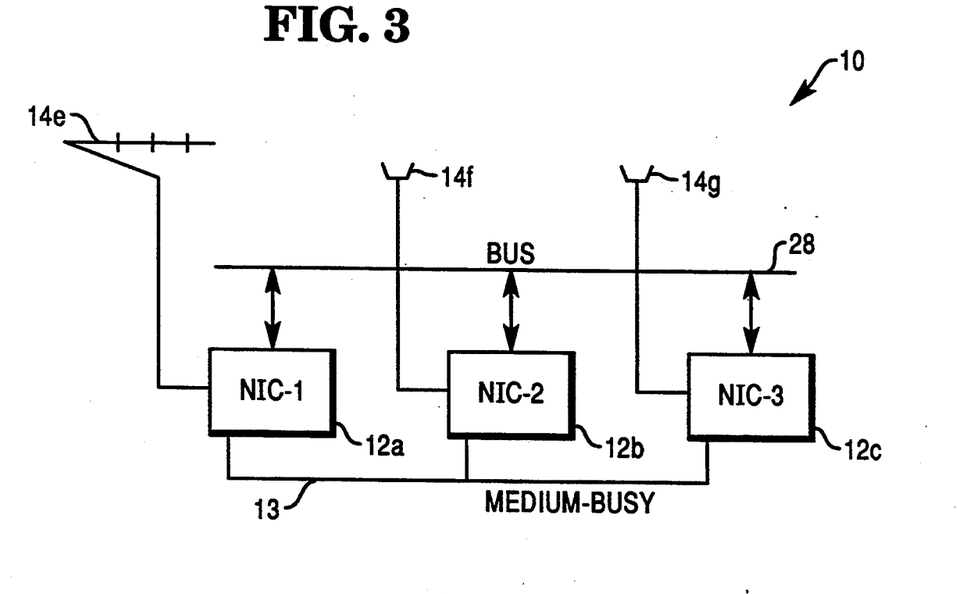
FIG. 3 is a block diagram showing the connection of antennas to a bridging LAN station according to the present invention.

FIG. 3 shows the connection in LAN station 10 between antennas 14e, 14f, 14g, network interface cards (NIC-1, NIC-2 AND NIC-3) and LAN station bus 28. Bus 28 is connected to a host CPU and memory (not shown) and has a number of expansion slots to which the NICs are connected. The FIG. 3 diagram does not correspond to the FIG. 1 or 2 configuration. For illustration purposes, it shows the connection of three antennas: a directional antenna 14e and local area antennas 14f and 14g. A signal line 13 for a MEDIUM_BUSY signal interconnects NIC-1, NIC-2 and NIC-3, as will be described more fully.

Figure 4:
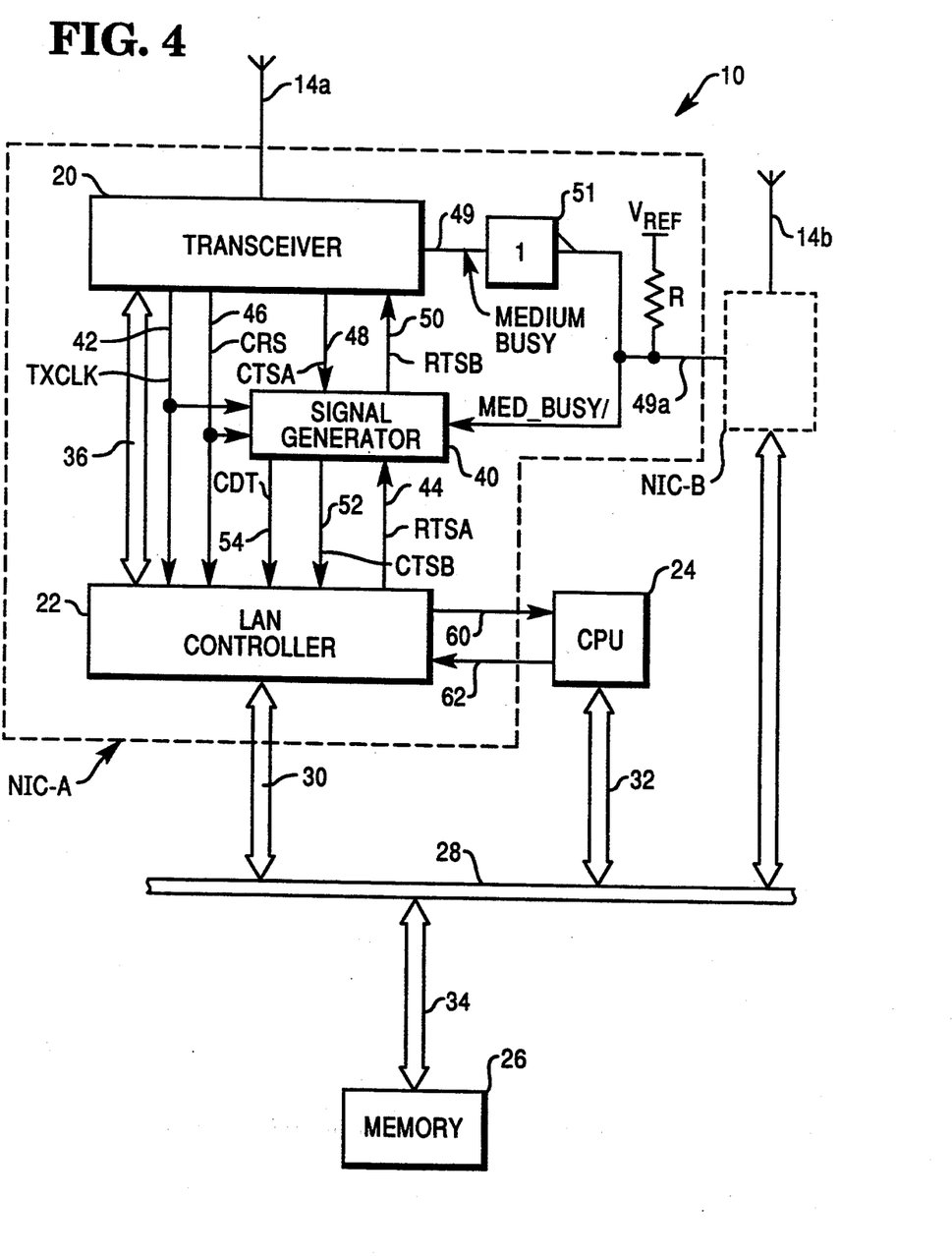
FIG. 4 is a block diagram of a bridging LAN station and network interface card.

FIG. 4 shows more detail of a station 10 such as depicted in FIG. 1. Station 10 includes network interface cards NIC-A and NIC-B, a central processor unit (CPU) 24, and a memory 26. NIC-A and NIC-B have similar configurations, so only NIC-A is shown in detail. NIC-A includes transceiver 20, a LAN controller 22 and a signal generator circuit 40. A local bus 28 is connected to LAN controller 22 by a bus 30, to CPU 24 by a bus 32, and to memory 26 by a bus 34. LAN controller 22 is a commercially available LAN controller device, suitable for the CSMA/CD (carrier sense multiple access with collision detection) protocol. In a preferred embodiment, LAN controller 22 is an Intel 82586 LAN coprocessor chip, available from intel Corporation of Santa Clara, Calif., U.S.A.

Transceiver 20 and LAN controller 22 are interconnected by a bus 36 which carries data and control signals. Signal generator circuit 40 is interposed between transceiver 20 and LAN controller 22.

Signal generator circuit 40 receives transmit clock pulses TXCLK from transceiver 20 over line 42 and a request-to-send signal RTSA from LAN controller 22 over a line 44. Signal generator circuit 40 also receives a carrier sense signal CRS and a clear-to-send signal CTSA from transceiver 20 over lines 46 and 48 respectively. Circuit 40 receives a medium busy MED_BUSY/signal over line 49a. The TXCLK pulses on line 42 and the CRS signal on line 46 are also applied directly to LAN controller 22.

Line 49 (MEDIUM_BUSY signal) is connected to signal generator circuit 40 through an open collector inverter 51. The output of inverter 51 (the MED_BUSY/signal) is connected to signal generator 40, line 49a and to a voltage source $V_{REF}$ through a resistor R. Line 49a is connected to NIC-B (as well as the other network interface cards connected to LAN station 10). Open collector inverter 51 allows a MEDIUM_BUSY signal from any connected NIC to activate MED_BUSY/by pulling line 49a low. In this manner, the MEDIUM_BUSY signal from any transceiver 20 in LAN station 10 is applied to all signal generators 40. As will be described, each transceiver can thereby control transmissions from the other transceivers.

Signal generator circuit 40 provides an output request-to-send signal RTSB over a line 50 connected to transceiver 20, an output clear-to-send signal CTSB over a line 52 connected to LAN controller 22, and an output simulated collision detect signal CDT over a line 54 also connected to LAN controller 22. The functions of the various signals applied to, and provided by, signal generator circuit 40 will be explained in detail later.

LAN controller 22 is connected to CPU 24 over signal lines 60 and 62, whereby control signals (such as interrupts) may be passed between CPU 24 and LAN controller 22. LAN controller 22 operates according to the CSMA/CD protocol, as set forth for example in the previously mentioned IEEE 802.3 standard. LAN controller 22 is a commercially available LAN controller device.

Figure 5A:
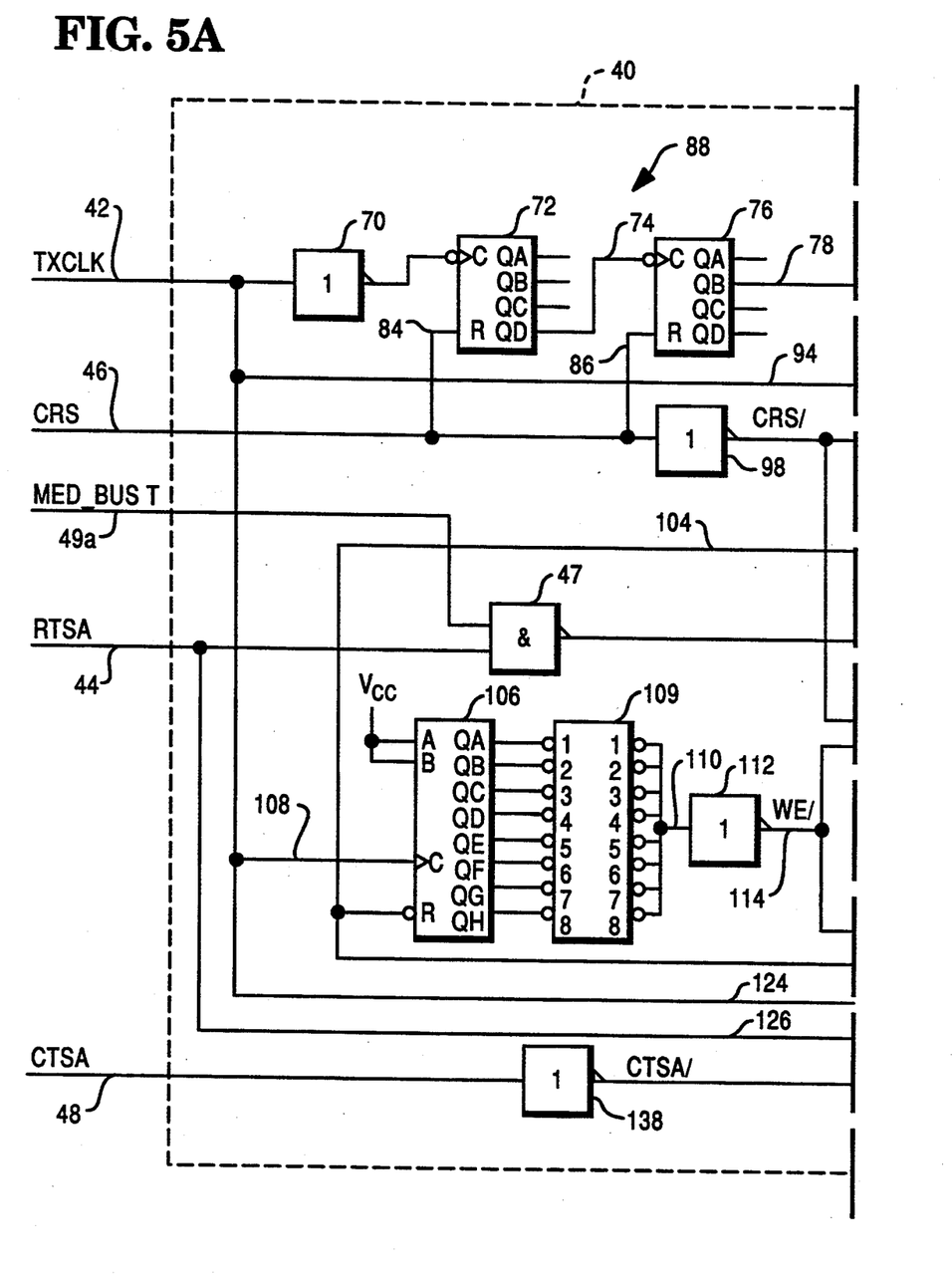
FIGS. 5A and 5B show detail of the signal generator circuit of FIG. 4.
Figure 5B:
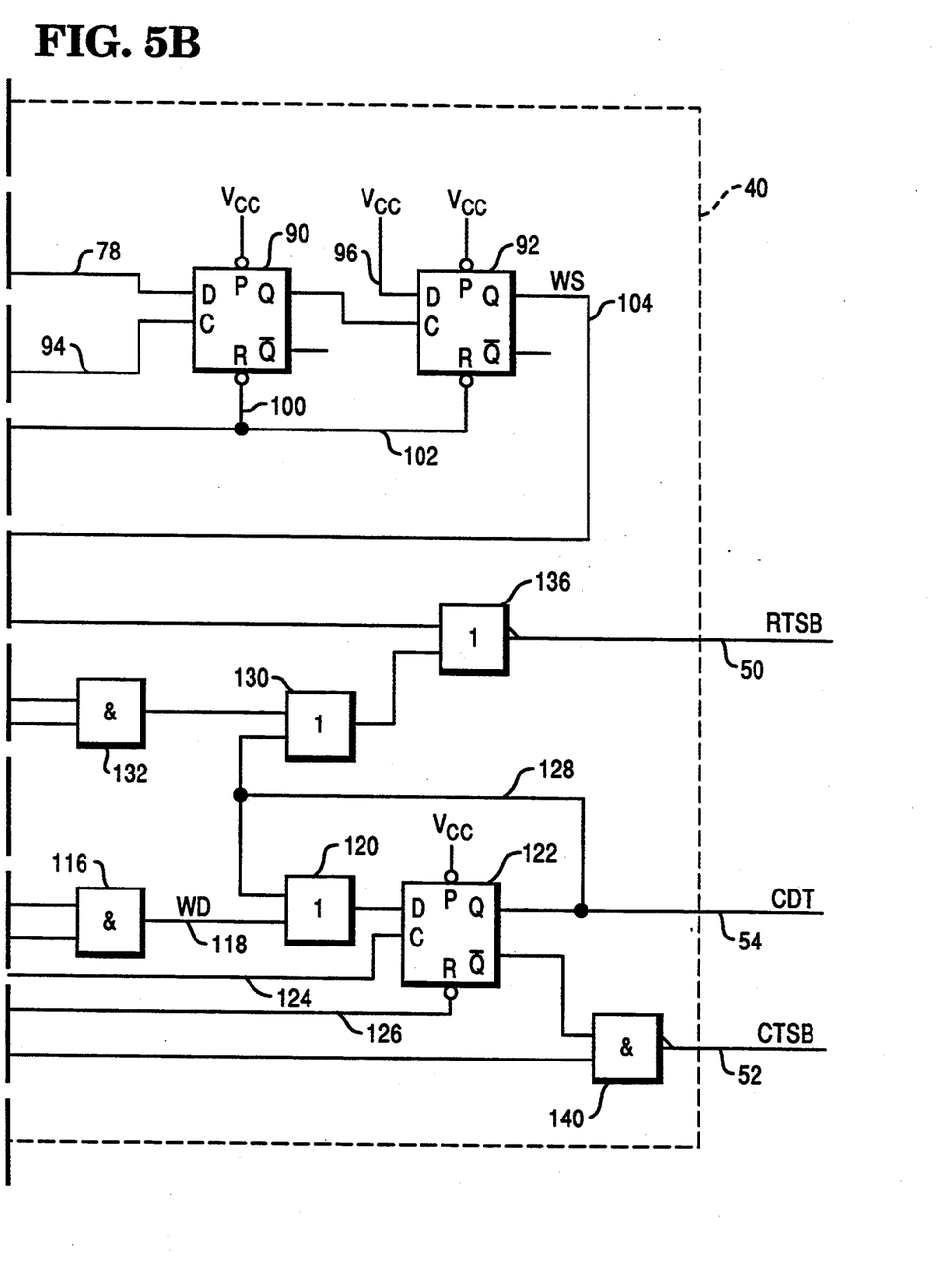

FIGS. 5A and 5B show details of signal generator circuit 40. Input line 42, which carries the TXCLK pulses is connected to an inverter 70, the output of which is connected to the count input of 4-bit counter 72 having its QD output connected over a line 74 to a 4-bit counter 76, the QB output of which is connected over a line 78 to the D input of a D-type flip-flop 90. Input line 46, which provides the carrier sense signal CRS, is connected over lines 84 and 86 to reset inputs of counters 72 and 76, respectively. It should be understood that the devices 70, 72, and 76 together form a timer, indicated generally as 88, such that an active signal appears at the QB output of counter 76 after a time corresponding to 32 TXCLK periods from the falling edge of the CRS signal.

The Q output of flip-flop 90 is connected to the clock input of a D-type flip-flop 92. The clock input of flip-flop 90 is connected over a line 94 to input line 42. The D input of flip-flop 92 is connected to a supply voltage $V_{cc}$. Input line 46 is connected to an inverter 98, the output of which is connected to the reset inputs of flip-flops 90 and 92, over lines 100 and 102, respectively. With this arrangement, the Q output of flip-flop 92 provides a window start signal WS on an output line 104.

Line 104 is connected to the reset input of an 8-bit shift register 106 (FIG. 5A), the clock input of which receives the TXCLK pulses over a line 108 connected to input line 42. The outputs of shift register 106 are connected to respective inputs of a header 109, having its outputs commonly connected to a line 110, whereby a desired one of the shift register outputs may be selected to apply a corresponding delayed signal to output line 110. Line 110 is connected to an inverter 112 whose output on line 114 provides an active low window end signal WE/. The WS and WE/signals on lines 104 and 114 are applied to an AND gate 116, the output of which provides a window signal WD on a line 118.

The window signal WD on line 118 is applied to an OR gate 120, the output of which is connected to the D input of a D-type flip-flop 122, the Q output of which is connected to output line 54 to provide the simulated collision detect signal CDT. The clock input of flip-flop 122 is connected over a line 124 to receive the TXCLK pulses from input line 42. The reset input of flip-flop 122 is connected over a line 126 to input line 44 which carries the request-to-send signal RTSA.

The Q output of flip-flop 122 is also connected via a line 128 to an input of OR gate 120 and to an input of an OR gate 130. Another input of OR gate 130 is connected to the output of an AND gate 132 which has inputs connected, respectively, to the output of inverter 98 and to the output of inverter 112.

Input line 44 is also connected to a NAND gate 47, the output of which is connected to an input of a NOR gate 136, a second input of which is connected to the output of OR gate 130. The output of NOR gate 136 is connected to the output line 50 to provide the request-to-send signal RTSB.

Input line 48 is connected to an inverter 138 the output of which is connected to an input of a NAND gate 140 a second input of which is coupled to the Q/output of flip-flop 122. The output of NAND gate 140 is connected to the output line 52 to provide the clear-to-send signal CTSB.

Of particular interest for purposes of the present invention is input line 49a which is connected to an input of NAND gate 47. Line 49a provides the MED_BUSY/signal. The output of NAND gate 47 is connected to one input of NOR gate 136, the output of which is the RTSB signal. Thus, whenever MED_BUSY/is active low, the RTSB signal is blocked.

The operation of signal generator circuit 40 will now be briefly described. When the carrier sense signal CRS on line 46 drops, timer 88 provides an active output signal on line 78 after 32 TXCLK pulse periods, corresponding to the interframe spacing (IFS) time. The output of timer 88 is synchronized by flip-flop 90 to eliminate any possible voltage spikes. The CRS/signal at the output of inverter 98 ensures that flip-flops 90 and 92 are enabled when the signal CRS drops. The output of flip-flop 92 provides the window start signal WS at a time 32 TXCLK pulse periods after the CRS signal drops. When the window start signal WS on line 104 is inactive, it resets shift register 106. When the window start signal WS becomes active, it is delayed and inverted by shift register 106, header 109, and inverter 112, to provide an inverted window end signal WE/on line 114. The WS signal on line 104 and the WE/signal on line 114 are combined in AND gate 116 to provide the window signal WD which is active for a predetermined number N of TXCLK pulse periods, where N lies between 1 and 8, and is selected by selecting a desired one of the outputs QA to QH of shift register 106 by connecting the corresponding equal numbered pins on header 109. In a preferred embodiment, the output QD of shift register 106 is selected, whereby, when the window signal WD has become active, it stays active for 4 TXCLK periods.

If the signal RTSA on line 44 becomes active during the active state of the window signal WD, flip-flop 122 provides the signal CDT on line 54, simulating a collision. The feedback from flip-flop 122 on line 128 to OR gate 120 ensures that when the signal CDT becomes active, it stays active until the falling edge of the signal RTSA (after controller 22 has transmitted the preamble and jam pattern).

Inverter 138 and NAND gate 140 ensure that the signal CTSB follows the signal CTSA as long as the signal CDT is not active (no simulated collision). When CDT becomes active, then the signal CTSB also becomes active independently of the signal CTSA.

The signal RTSB is produced by utilizing NAND gate 47, AND gate 132, OR gate 130 and NOR gate 136. Thus, the signal RTSB does not follow the signal RTSA if the signal CDT is active (simulated collision), thereby preventing transmission of the preamble and jam pattern. Also, since the signal CTSA/from inverter 138 is applied to NAND gate 140 together with the output of flip-flop 122, the signal CTSB follows the signal CTSA as long as CDT is inactive. Furthermore, the RTSB signal is not generated if MED_BUSY/is applied to NAND gate 47. This prevents transceiver 20 and antenna 14a (FIG. 4) from transmitting.

It should be noted that although the CRS signal and MEDIUM_BUSY signal are related, MEDIUM_BUSY will always be asserted just prior to the generation of CRS by transceiver 20.

The operation of LAN station 10 will now be briefly described. As shown in FIGS. 1 and 4, LAN station 10 has at least two antennas 14a and 14b. Each antenna is capable of transmitting and receiving data. Each antenna "listens" for RF signals from other stations in its network by monitoring the airwaves. When an RF signal is received by either of the antennas, the electrical signal MEDIUM_BUSY is generated by the transceiver 20 connected to the antenna (FIG. 4). Open collector inverter 51 drives line 49a low and the signal MED_BUSY/is provided to the signal generator 40 of each NIC in station 10. As discussed previously, the MED_BUSY/signal prevents each transceiver 20 from receiving the request-to-send signal RTSB. This blocks transmissions from transceiver 20 which prevents all antennas connected to LAN station 20 from transmitting as long as one of the other antennas is receiving RF signals. As soon as the reception of RF signals ceases, the MEDIUM_BUSY signal is deactivated.

Signal data that is received from AREA-1 by antenna 14a of LAN station 10 is stored in memory 26 (FIG. 4). If the data is destined for stations in AREA-2, it is transmitted from antenna 14b after MEDIUM_BUSY is deactivated.

It will be clear to those skilled in the art that the present invention is not limited to the specific embodiment disclosed and illustrated herein. Numerous modifications, variations, and full and partial equivalents can be undertaken without departing from the invention as limited only by the spirit and scope of the appended claims.

What is desired to be secured by Letters Patent of the United States is as follows.

What is claimed is:

1. A method of linking two wireless local area networks (LANs) comprising:
   providing a processing station having at least two antennas, each antenna transmitting and receiving information in a respective LAN;
   receiving RF signal data on a first of said antennas;
   generating an electrical signal in response to said RF signal; and
   using said electrical signal to prevent the other antennas from transmitting as long as the first antenna is receiving RF signal data.

2. The method of claim 1 further comprising:
   deactivating said electrical signal when reception of RF signal data terminates.

3. The method of claim 2 further comprising:
   storing signal data received by said first antenna in said processing station and transmitting it from another antenna after said electrical signal is deactivated.

4. A method for operating a wireless local area network (LAN) station which has first and second antennas for communicating with first and second LANs, respectively, comprising:
   blocking transmissions from one antenna when the other antenna is receiving RF signals;
   wherein each antenna monitors the airwaves for RF signals when neither is transmitting;
   generating an electrical signal from an antenna when it receives RF signals; and
   using the electrical signal to control transmission from the other antenna.

5. A local area network (LAN) station comprising:
   first and second transceiver and antenna assemblies for communicating with first and second LANs, respectively; and
   means for blocking transmissions from said first transceiver and antenna assembly when said second transceiver and antenna assembly is receiving RF signals;
   a processor;
   first and second network interface cards connecting respective first and second transceiver and antenna assemblies to said processor;
   said blocking means including a signal line interconnecting said transceiver and antenna assemblies and interface cards;
   wherein each of said transceiver and antenna assemblies is connected to said signal line by an open collector transistor.

* * * * *